United States Patent [19]

Luu

[11] Patent Number: 5,071,367
[45] Date of Patent: Dec. 10, 1991

[54] POWER STRIP WITH ADJUSTABLE CORD

[75] Inventor: Daniel H. V. Luu, Carmel, Ind.

[73] Assignee: Pacomex Industries, Inc., Indianapolis, Ind.

[21] Appl. No.: 577,451

[22] Filed: Sep. 4, 1990

Related U.S. Application Data

[63] Continuation-in-part of Ser. No. 418,185, Oct. 6, 1989, abandoned.

[51] Int. Cl.[5] .................. H01R 25/16; H01R 13/60
[52] U.S. Cl. .................................. 439/501; 439/502; 191/12.4
[58] Field of Search ............... 439/4, 456, 459, 501, 439/502, 620, 654, 652; 191/12.4; 242/85.1

[56]  References Cited

U.S. PATENT DOCUMENTS

| D. 270,629 | 9/1983 | Drew | D13/30 |
|---|---|---|---|
| D. 285,435 | 9/1986 | Hoehne | D13/30 |
| D. 294,487 | 3/1988 | Bannigan | D13/30 |
| 2,231,001 | 2/1941 | Engstrom | 439/501 |
| 2,351,379 | 6/1944 | Wehringer | 24/71.2 |
| 2,502,658 | 4/1950 | Lindmark | 439/620 |
| 2,536,776 | 1/1951 | Smellie | 242/85.1 |
| 2,561,556 | 7/1951 | Bell | 191/12.4 |
| 2,574,992 | 11/1951 | Webster | 242/96 |
| 3,042,337 | 7/1962 | Dinneen | 242/85.1 |
| 3,213,185 | 10/1965 | Petrick | 191/12.4 |
| 3,289,260 | 12/1966 | Buscall, Jr. | 24/129 |
| 3,290,453 | 12/1966 | Jensen | 439/501 |
| 3,646,684 | 3/1972 | Paulsen | 242/85.1 |
| 4,095,871 | 6/1978 | Holte | 242/85.1 |
| 4,123,012 | 10/1978 | Hough | 242/85.1 |
| 4,177,961 | 12/1979 | Gruenewald | 242/85.1 |
| 4,500,150 | 2/1985 | Leibensperger et al. | 439/502 |
| 4,687,154 | 8/1987 | Deweese | 242/96 |
| 4,717,350 | 1/1988 | Lax | 439/620 |
| 4,778,125 | 10/1988 | Hu | 242/85.1 |
| 4,867,701 | 9/1989 | Wiand | 439/502 |

FOREIGN PATENT DOCUMENTS 803250 9/1936 France ...................... 191/12.4

Primary Examiner—Gary F. Paumen
Attorney, Agent, or Firm—Barnes & Thornburg

[57]  ABSTRACT

A power strip with adjustable cord includes an electrical cord for carrying electrical power having a first end including a plug for insertion into an electrical outlet and a second end including a power strip body having a first side including elevated end portions and a depressed central portion, a second side, and a perimetral edge member joining the first and second sides. The central depressed portion of the first side includes a plurality of electrical outlets for distributing electrical power therefrom divided into at least one unswitched outlet and at least one switched outlet, and a switch for switching power off and on to the at least one switched outlet. A groove in the perimetral edge member extends around most of the body for adjusting the fully extended length of the electrical cord, the groove being defined in part by generally parallel side walls spaced apart from each other by a distance about equal to a diameter of the cord, and by an inner wall spaced inwardly by a distance about equal to a diameter of the cord. Nubs are provided on the edges of the first and second sides for retaining at least a portion of the electrical cord in the groove. This permits the length of the cord to be adjusted to any desired length.

12 Claims, 3 Drawing Sheets

POWER STRIP WITH ADJUSTABLE CORD

CROSS-REFERENCE TO RELATED APPLICATIONS

This is a continuation-in-part of my earlier patent application serial number 07/418,185 filed Oct. 6, 1989, now abandoned.

BACKGROUND OF THE INVENTION

The present invention relates generally to power strips and particularly to power strips fixed to power cords that provide extended delivery of electrical power for a location spaced at a distance from a fixed position electrical power outlet.

In modern homes and offices, it is conventional to position duplex electrical outlets at spaced strategic locations in almost every room. Many rooms will often include more than one of such fixed location wall-mounted duplex electrical outlet for supplying power to a wide variety of appliances and equipment. Despite the number and position of such wall-mounted duplex outlets, it often becomes necessary to supply one or more appliances or pieces of equipment with power at a position sufficiently spaced from any duplex outlet that an electrical extension cord is required.

When such an electrical extension is required, the presence of the electrical cord of the extension often contributes to an unsightly appearance and may even result in a safety hazard if not carefully directed so as to avoid pedestrian traffic and the like. To achieve a neater and cleaner appearance, and help minimize any possible safety hazards, various reel and take-up devices have been employed such as are shown in U.S. Pat. Nos. 2,351,379; 4,123,012; 4,177,961; and 4,687,154. Additionally, some power strips have been provided with a cord storing feature. Examples of such power strips are found in U.S. Pat. Nos. 3,290,453; 4,095,871; 4,778,125; 4,867,701; D-294,487; and French Patent 803,250.

All of the take-up devices and power strips shown in the listed patents reduce the length of free electrical cord thereby achieving a neater and safer area. However, except for the strip shown in Wiand U.S. Pat. No. 4,867,701, the take-up devices and power strips themselves are generally not esthetically appealing. The Wiand device achieves its neat and clean appearance by providing the cord storing feature in a separate cradle in which the power strip is then removable mounted. While this is an acceptable solution in certain situations, in other situations it is desirable to provide an esthetically appealing power strip having an integral cord adjustment feature. From a manufacturing point of view it is desirable to achieve such a structure in as simple a manner as possible so as to reduce assembly costs while retaining safety and reliability.

SUMMARY OF THE INVENTION

In accordance with the present invention, an electrical cord for carrying electrical power includes a first end having a plug for insertion into an electrical outlet and a second end to which the power strip is fixed. The power strip generally comprises a body having a first side member, a second side member, and a perimetral edge joining the first and second side members. The body includes a plurality of electrical outlets for distributing electrical power and a cord adjustment means situated in the perimetral edge of the body for storing at least a portion of the length of the electrical cord.

The cord adjustment means generally comprises a cord holder situated between an upper housing and a lower housing (first and second side members), the cord holder including a groove element situated along the perimetral edge extending around the body. Means are provided on confronting portions of the upper and lower housings for retaining at least a portion of the electrical cord in the groove. The electrical cord retaining means preferably is in the form of a plurality of spaced nubs protruding from the perimetral edge of the upper and lower housings over the outer portion of the groove. The groove itself is defined in part by generally parallel edges of the upper and lower housings spaced apart from each other by a distance about equal to a non-zero whole number multiple of the diameter of the cord. The groove is also defined in part by an inner wall formed in the separate cord holder element situated between the upper and lower housings, the inner wall being spaced inwardly from the perimetral edge of the upper and lower housings by a distance about equal to a non-zero whole number multiple of the diameter of the cord.

One feature of the power strip of the present invention is the cord storing groove which permits one or more lengths of the cord, or even a fraction of such a length, to be wrapped around the perimetral edge of the power strip and retained by the retaining means. This permits the length of the cord to be adjusted to any desired length. This feature has the advantage of making the power strip and extension cord attach thereto, and have a neat and clean appearance regardless of the length of cord required as the incremental lengths of the cord stored or released can be merely a small fraction of the perimeter length of the power strip. This has the further advantage of minimizing any possible safety hazard which might occur due to the presence of an uncontrolled length of electrical cord lying in an otherwise exposed area.

Another feature of the power strip of the present invention is the molding of the cord storing groove as a separate element to be held between the upper and lower housings, the housings having the cord retaining means situated on confronting edges thereof. The provision of a separate cord storing groove element has the advantages of simplifying the manufacture of the retaining means and permitting a variation in capacity of the cord storing groove element by substituting one cord storing groove element for another during assembly of the power strip while still retaining the attractive appearance of the power strip as a whole.

Yet another feature of the power strip of the present invention is the provision of securing means for securing a Portion of the cord near the second end to the body of the power strip, preferably, the lower housing. The securing means includes at least one support member for engaging the cord and clamping means for securing the cord to the at least one support member. This feature advantageously reduces stress and strain on a connection between the second end of the cord and the power strip during handling of the power strip by a user.

Additional features and advantages of the invention will become apparent to those skilled in the art upon consideration of the following description of a preferred embodiment exemplifying the best mode of carrying out the invention as presently perceived. The detailed description particularly refers to the accompanying drawings.

DESCRIPTION OF PREFERRED EMBODIMENTS

Figure 1:
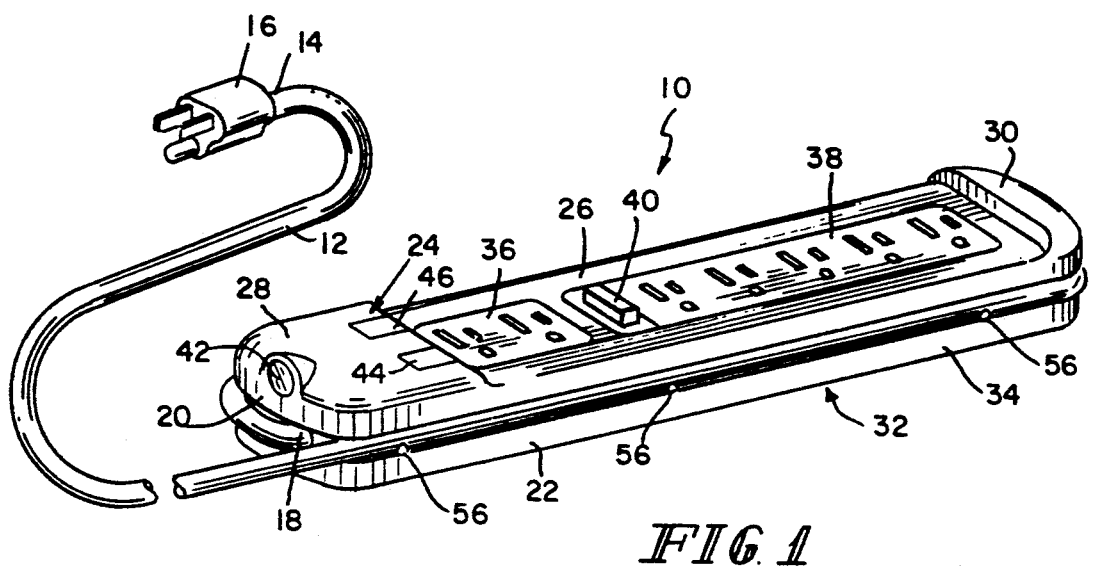
FIG. 1 is a perspective view of a cord storing power strip in accordance with the present invention showing the electrical power cord wrapped about the perimeter of the power strip.

A cord storing power strip 10 in accordance with the present invention is shown in perspective in FIG. 1. The power strip 10 comprises an electrical cord having a first end 14 which includes a plug 16 for insertion into an electrical outlet such as a wall-mounted duplex outlet (not shown). The electrical cord 12 includes a second end 18 fixed to a first end 20 of power strip body 22.

The power strip body 22 generally comprises an upper surface (side member) 24 having a depressed central portion 26 and raised end portions 28 and 30. The body 22 also includes a lower surface (side member) 32 separated from the upper surface 24 by a perimetral edge 34. The depressed central portion 26 of upper surface 24 is shown to include a first set of electrical outlets 36 and a second set of electrical outlets 38 separated by a switch 40. The switch 40 controls the flow of electrical power from cord 12 to the switched electrical outlets 38 so that power can be switched either on or off. On the other hand, electrical outlets 36 are unswitched, that is, are always connected to power cord 12 and are not controlled by switch 40.

The raised end portion 28 of the upper surface 24 is shown to also include a circuit breaker reset button 42 for resetting a circuit breaker included within the power strip 10 for breaking the flow of power to the outlets 36 and 38 in the event of an excessive current demand. A surge indicator 44 is also situated on the upper surface 24 for indicating operation of a surge protection means provided for breaking the flow of power to the power strip outlets 36 and 38 in the event of a voltage surge beyond the preset value. An indicator 46 is further included for indicating a ground condition of the power strip 10.

Figure 2:
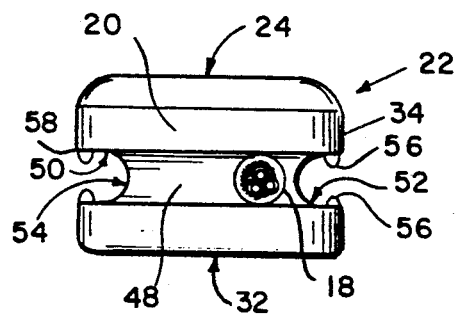
FIG. 2 is an end view of the power strip shown in FIG. 1 with the electrical cord severed therefrom for the purpose of clarity.
Figure 3:
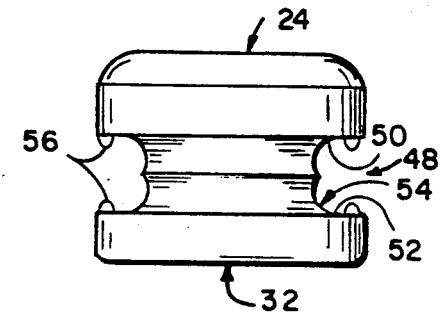
FIG. 3 is an opposite end view of an alternative embodiment of a power strip in accordance with the present invention.
Figure 4:
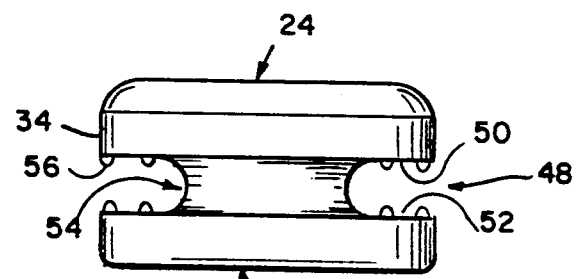
FIG. 4 is an opposite end view of yet another alternative embodiment of a power strip in accordance with the present invention.
Figure 5:
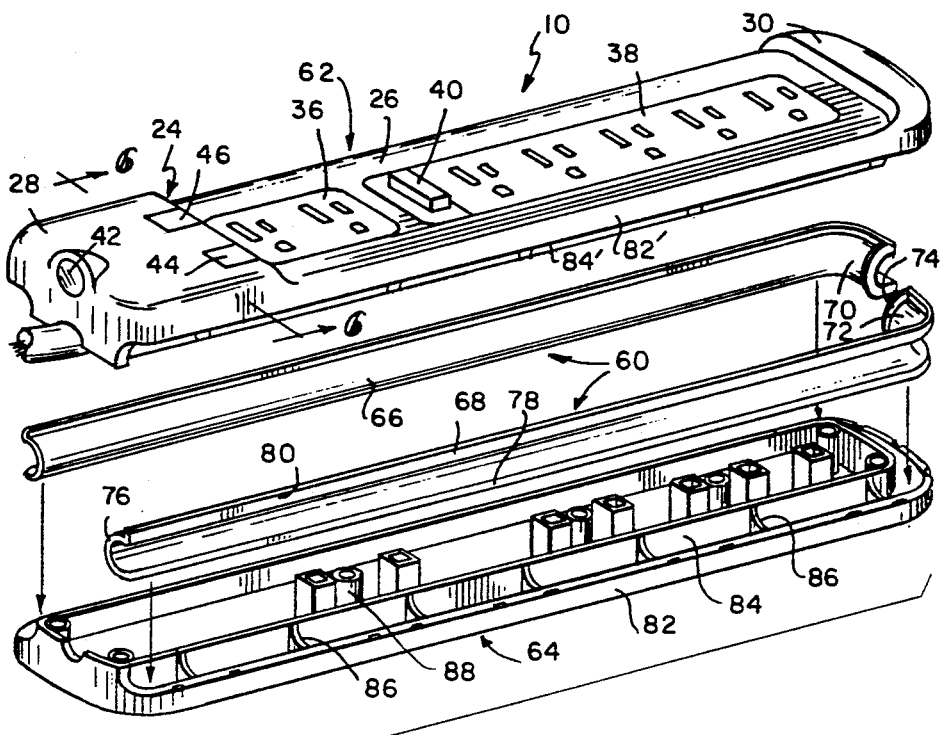
FIG. 5 is an exploded perspective view of one embodiment of a power strip in accordance with the present invention using an upper housing, a two-piece cord storing groove element and a lower housing

The perimetral edge 34 includes a groove 48 best shown in its alternative embodiments in FIGS. 2, 3, and 4. As shown in FIG. 2, the cord 18 has been severed from the first end 20 of the power strip body 22 for clarity and to permit comparison between the diameter of the power cord 18 and the groove 48. The groove 48 is defined by an upper side wall 50 and a lower side wall 52 which is situated parallel to the upper side wall 50. The innermost wall of the groove 54 is shown to be concave and depressed inwardly from the perimetral edge 34. A plurality of longitudinally spaced-apart or offset nubs 56 are situated adjacent the lip 58 of the groove 48 and act to retain the electrical cord 12 in groove 48.

In general, the upper side wall 50 is shown to be spaced from the lower side wall 52 by a non-zero whole number multiple of the diameter of the cord 18. In FIGS. 2 and 4, the whole number is 1 while in FIG. 3 the whole number is 2. In a similar manner, the inner wall 54 of groove 48 is spaced inwardly from the perimetral edge 34 by a distance that is equal to a non-zero whole number multiple of the diameter of the cord. In FIGS. 2 and 3 the whole number is 1 while in FIG. 4 the whole number is 2. It will be appreciated that the spacing between the upper and lower edges 50 and 52, and the spacing between the inner edge 54 and perimetral edge 54 can be increased beyond that illustrated in FIGS. 2, 3, and 4, or can be restricted to a single cord diameter.

This variation is most conveniently achieved by providing a separate cord storing groove member 60 retained between an upper housing 62 and a lower housing 64 as shown in the embodiment of FIGS. 5 to 9. The groove member 60 is shown to comprise a matching Pair of groove elements 66 and 68. The groove elements 66 and 68 are shown to comprise generally parallel linear troughs having curved end sections 70 and 72 bending toward each other to form a junction 74. In cross section, a groove member can be seen to comprise an elongated U-shaped portion 76 with vertically extending flanges 78 and 80.

The lower housing 64 is shown to include a peripheral edge 82 with an inner wall 84 positioned parallel to the peripheral edge 82 by a plurality of gussets 86. The upper housing also includes a peripheral edge 82' with an inner wall 84' positioned Parallel to the peripheral edge 82' by a similar plurality of gussets 86'. Spacing supports 88 are provided to permit coupling of the upper housing 62 to the lower housing 64.

Figure 6:
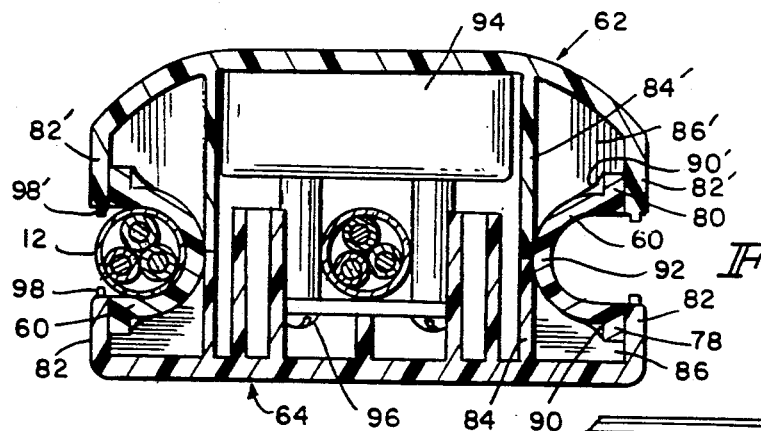
FIG. 6 is a sectional view of the power strip shown in FIG. 5 taken along line 6—6.

As seen in FIG. 6, the gussets 86, 86' joining the perimetral edges 82, 82' to the parallel inner walls 84, 84' also define channels 90 and 90' adapted to receive the downwardly and upwardly extending vertical flanges 78 and 80 of the groove element 60. The bight 92 of the groove element 60 is given additional support by the junction of the support walls 84 and 84'.

An inner housing 94 within the upper housing 62 contains the electronics related to the surge protection and indication means 42, 44, and 46. Screws or equivalent means 96 can be used to join the upper housing 62 and lower housing 64 together with the groove member 60 situated therebetween. When the housings are assembled, the nubs 98 and 98' which protrude from the edges 82 and 82', respectively, are seen to protrude into the space defined by the upper end lower margins of the U-shaped groove member 60 by a distance sufficient to ensure retention of court 12 yet still permit the cord be removed from the groove member 60 by an appropriate urging force. As shown in detail in FIG. 9, the nubs 98 and 98' are preferably longitudinally offset from each other. This reduces the pinching effect necessary to insert or remove the cord from the groove member and at the same time permits length element by length element removal or addition of the cord to the groove member 60.

Figures 7, 8, 9:
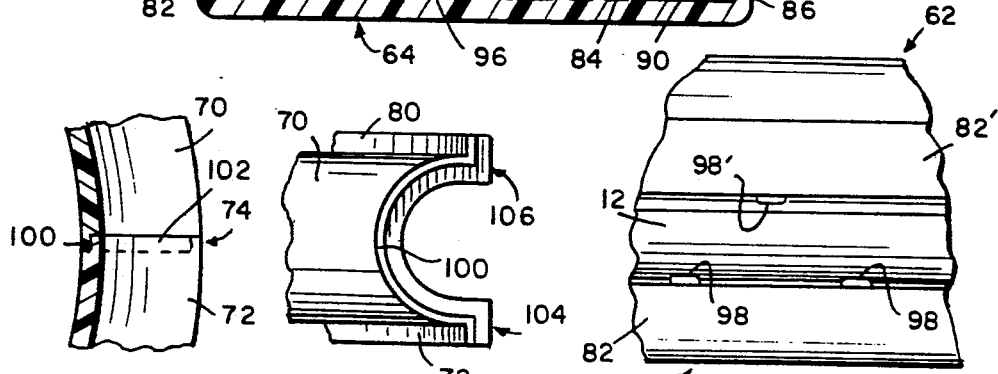
FIG. 7 is a sectional view of the two-piece cord storing groove element taken through the junction of the two elements thereof.
FIG. 8 is a detail elevation view of one end of one cord storing groove element showing the joining flange.
FIG. 9 is a side elevation view, broken away, of the power strip shown in FIG. 5.

The area of the junction 74 of the two groove elements 66 and 68 is shown in detail in FIGS. 7 and 8. It will be noted that member 70 includes an outer shoulder 100 while element 72 includes an inner shoulder 102 which overlap to define the junction 74. This mating overlap of shoulders 100 and 102 reduces the intrusion of unwanted dust within the housing which might ultimately contribute to product degradation and/or failure. In like manner, the outside surfaces 104 and 106 of the downwardly and upwardly extending flanges 78 and 80 mate with the inside surfaces of peripheral edges 82 and 82' to inhibit the intrusion of unwanted dust along the perimeter of the housing.

Figure 10:
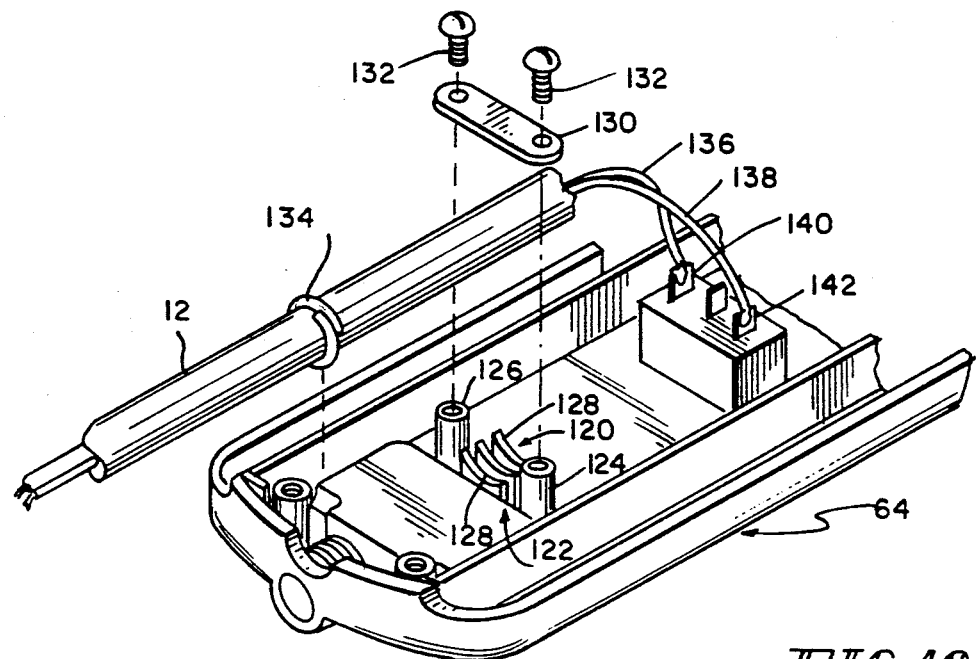
FIG. 10 is a fragmentary exploded perspective view illustrating strain relief mechanisms for reducing strain on the cord.

Another aspect of the present invention is illustrated in FIG. 10. The lower housing 64 is formed to include a strain relief mechanism 120 including support members or strain relief teeth 122 for engaging a portion of cord 12. Posts 124 and 126 are situated on opposite sides of the strain relief teeth 122. The strain relief teeth 122 include arcuately shaped upper surfaces 128 which conform generally to the cross-sectional configuration of cord 12. After cord 12 is laid on the strain relief teeth 122 during assembly, a retaining strap 130 is used to secure the cord 12 to the strain relief teeth 122. Two self-tapping screws 132 secure the retaining strap 130 to the posts 124 and 126 to hold the cord 12 in position. A retaining ring 134 further aids in relieving strain between the cord 12 and to the housing 64. Wires 136 and 138 extend from cord 12, and are soldered inside the power strip 10 at locations 140, 142, respectively. Strain relief mechanism 120 helps to reduce strain on the solder points 140 and 142 which could break the electrical contacts. A user may pull on the cord 12 or may use the power strip 10 to pull the plug 16 from the wall socket. Without strain mechanism 20, the strain on contact solder points 140 and 142 could cause a device to fail over time.

Figure 11A:
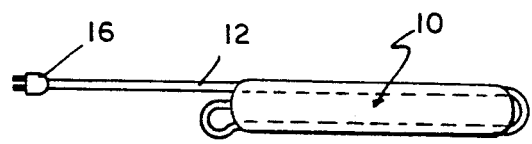
FIGS. 11A-11D are diagrammatical views illustrating examples of the cord adjustment feature of the present invention.
Figure 11B:
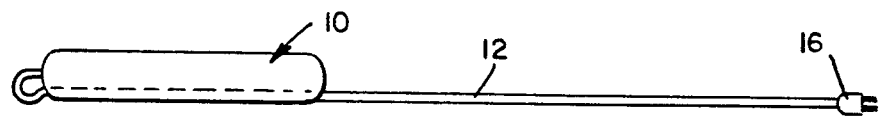
Figure 11C:
Figure 11D:
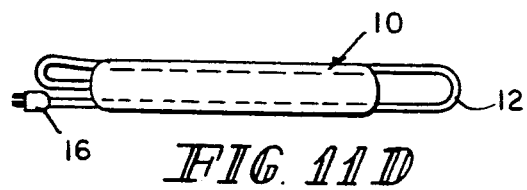

The adjustability feature of the present invention is further illustrated in FIGS. 11A-11D. If the full length of cord 12 is necessary to reach a wall outlet, the cord 12 can be fully extended without being retained or held within the power strip 10. FIG. 11A shows the cord 12 wrapped around substantially the entire periphery of strip 10. FIG. 11B shows the power cord retained only along one side of power strip 10. FIG. 11C shows the power cord 12 retained along one side of the power strip 10 with an extra length of loop added at one end of the power strip. FIG. 11D shows the cord wrapped around substantially the entire periphery of power strip 10 with a loop at one end to shorten the distance between plug 16 and power strip 10. It is understood that these four illustrations are merely examples of various configurations of the adjustability feature. According to the present invention, the length of the cord 12 can be adjusted to any desired length depending upon the length of cord 12 necessary to reach the wall outlet.

It will be appreciated that although the invention has been described in detail with reference to the illustrated preferred embodiments, variations and modifications exist with the scope and spirit of the invention as described and as defined in the following claims.

What is claimed is:

1. A power strip comprising: an electrical cord for carrying electrical power having a first end including a plug for insertion into an electrical outlet and a second end, a power strip fixed to the second end of the cord comprising a body having a first side defined by an upper housing, a second side defined by a lower housing, and a perimetral edge member joining the upper and lower housings, the body including a plurality of electrical outlets for distributing electrical power therefrom, and cord length adjusting means situated in the perimetral edge member of the body for adjusting the fully extended length of the electrical cord between the plug and the power strip, the perimetral edge member comprising a pair of somewhat J-shaped elements joined together to form a somewhat U-shaped member, each of the somewhat J-shaped elements including a shoulder on an end thereof, the shoulders overlapping at the junction of the two somewhat J-shaped elements.

2. A power strip comprising: an electrical cord for carrying electrical power having a first end including a plug for insertion into an electrical outlet and a second end, a power strip fixed to the second end of the cord comprising a body having a first side defined by an upper housing, a second side defined by a lower housing, and a perimetral edge member joining the upper and lower housings, the body including a plurality of electrical outlets for distributing electrical power therefrom, and cord length adjusting means situated in the perimetral edge member of the body for adjusting the fully extended length of the electrical cord between the plug and the power strip, the perimetral edge member further comprising vertically extending flanges having outer surfaces abutting inner surfaces of the edges of the upper and lower housings.

3. A power strip comprising: an electrical cord for carrying electrical power having a first end including a plug for insertion into an electrical outlet and a second end, a power strip fixed to the second end of the cord comprising a body having a first side member, a second side member separate from the first side member, and a perimetral edge member separate from the first and second side members and joining the first and second side members, the body including a plurality of electrical outlets situated at least in the first side member for distributing electrical power therefrom, and a groove in the perimetral edge member extending around the body for adjusting the fully extended length of the electrical cord between the plug and the power strip, the groove being defined in part by generally parallel side walls spaced apart from each other by a distance about equal to a diameter of the cord and by an inner wall spaced inwardly by a distance about equal to a diameter of the cord, and means for retaining at least a portion of the electrical cord in the groove.

4. The power strip of claim 3 wherein the retaining means comprises a plurality of spaced nubs protruding into the groove from edges of the first and second side members of the body.

5. The power strip of claim 4 wherein the perimetral edge member comprises a pair of somewhat J-shaped elements joined together to form a somewhat U-shaped member.

6. The power strip of claim 3 further comprising means for securing a portion of the cord near the second end to the body to reduce strain on a connection between the power strip and the second end of the cord.

7. The power strip of claim 6 wherein the securing means includes a support member coupled to the body for engaging the cord and clamping means for securing the cord to the support member.

8. A power strip comprising: an electrical cord for carrying electrical power having a first end including a plug for insertion into an electrical outlet and a second end, a power strip fixed to the second end of the cord comprising a body having a first side members, a second side members, and a perimetral edge member joining the first and second side members, the body including a plurality of electrical outlets situated at least in the first side member for distributing electrical power therefrom, and a groove in the perimetral edge member extending around the body for adjusting the fully extended length of the electrical cord between the plug and the power strip, the groove being defined in part by generally parallel side walls spaced apart from each other by a distance about equal to a diameter of the cord and by an inner wall spaced inwardly by a distance about equal to a diameter of the cord, and means for retaining at least a portion of the electrical cord in the groove, the retaining means comprising a plurality of spaced nubs protruding into the groove from edges of the first and second side members of the body, the perimetral edge member comprising a pair of somewhat J-shaped elements joined together to form a somewhat U-shaped member, each of the somewhat J-shaped elements including a shoulder on an end thereof, the shoulders overlapping at the junction of the two somewhat J-shaped elements.

9. The power strip of claim 8 wherein the perimetral edge member further comprises vertically extending flanges having outer surfaces abutting inner surfaces of the edges of the first and second side members.

10. A power strip comprising: an electrical cord for carrying electrical power having a first end including a plug for insertion into an electrical outlet and a second end, a power strip fixed to the second end of the cord comprising a body having a first side member including elevated end portions and a depressed central portion, a second side member separate from the first side member, and a perimetral edge member separated from the first and second side members and joining the first and second side members, the central depressed portion oft he first side member including a plurality of electrical outlets for distributing electrical power therefrom divided into at least one unswitched outlet and at least one switched outlet, switch means situated in the central depressed portion of the first side member for switching power off and on to the at least one switched outlet, and a groove in the perimetral edge member extending substantially around the body for adjusting the fully extended length of the electrical cord between the plug and the power strip, the groove being defined in part by generally parallel side walls spaced apart from each other by a distance about equal to a diameter of the cord, and by an inner wall spaced inwardly by a distance about equal to a diameter of the cord, and a plurality of spaced nubs protruding into the groove from an edge of at least one of the first and second side members.

11. The power strip of claim 10 further comprising means for securing a portion of the cord near the second end to the body to reduce strain on a connection between the power strip and the second end of the cord.

12. The power strip of claim 11 wherein the securing means includes a support member coupled to the body for engaging the cord and clamping means for securing the cord to the support member.

* * * * *